United States Patent [19]

Kinghorn

[11] Patent Number: 4,908,707
[45] Date of Patent: Mar. 13, 1990

[54] VIDEO CASSETTE RECORDER PROGRAMMING VIA TELETEXT TRANSMISSIONS

[75] Inventor: John R. Kinghorn, Ashtead, Great Britain

[73] Assignee: U.S. Philips Corp., New York, N.Y.

[21] Appl. No.: 221,156

[22] Filed: Jul. 19, 1988

[30] Foreign Application Priority Data

Jul. 20, 1987 [GB] United Kingdom ................ 8717132
Aug. 5, 1987 [GB] United Kingdom ................ 8718557

[51] Int. Cl.⁴ ............................................. H04N 7/087
[52] U.S. Cl. ................................... 358/147; 358/142; 358/191.1; 358/194.1; 360/27; 360/33.1
[58] Field of Search .................. 358/84, 86, 142, 146, 358/147, 194.1, 191.1, 310, 311, 335, 337; 360/13, 14.1, 27, 33.1, 40, 48, 53, 55, 61, 69

[56] References Cited

U.S. PATENT DOCUMENTS 4,706,121 11/1987 Young .................................. 358/147

FOREIGN PATENT DOCUMENTS 0179001 4/1986 European Pat. Off. .
0191149 8/1986 European Pat. Off. .

OTHER PUBLICATIONS

BBC et al., "Broadcast Teletext Specification", (Sep. 1976).

Primary Examiner—John W. Shepperd
Assistant Examiner—Michael D. Parker
Attorney, Agent, or Firm—Thomas A. Briody

[57] ABSTRACT

A system for video recorder programming using existing television broadcast teletext transmissions. The programs required are chosen from schedules displayed on teletext pages, the necessary control information is loaded automatically into a video recorder, and program labels are transmitted to ensure that the correct programs will be recorded even if program timings are altered. All the control information for achieving the above are fitted into the coding structure of a teletext transmission using extension packets additional to data packets containg display data. The invention also extends to a video recorder with its own teletext decoder for processing the control information.

6 Claims, 3 Drawing Sheets

VIDEO CASSETTE RECORDER PROGRAMMING VIA TELETEXT TRANSMISSIONS

This invention relates to a television transmission system comprising a transmitter station and one or more receivers. The invention relates more particularly to such a television transmission system which is adapted for video recorder programming using teletext data.

The programming of a domestic video recorder is normally carried out manually by a user operating a combination of a plurality of programme keys which are provided on a control panel. The programming involves the selection of a television channel, the selection of a date, the selection of a start recording time, and the selection of a stop recording time (or a record time period).

It has been proposed in West Germany to use an existing teletext service, known as Videotext, to transmit programming information which can be used to programme a video recorder automatically to record a future programme following selection of that programme by a user. The facility providing this programming information is called "Videotext Programmed Videorecorder" (VPV).

European Patent Specification No. 0 191 149 (A1) relates to this automatic programming of a video recorder. This patent specification refers to Videotext as an information service in which data blocks are transmitted in specific lines in the field blanking interval of a television signal. The actual teletext system which this Videotext information service uses conforms essentially to that described in the document "Broadcast Teletext Specification", September 1976, published jointly by the British Broadcasting Corporation, Independent Broadcasting Authority and British Radio Equipment Manufacturers' Association.

One facility of the Videotext information service is the provision of programme schedules which are displayed as teletext pages and given details of the programmes and programming timings in at least the television channel which is used by the transmission source that provides the Videotext information service.

It is known in the art that the transmitted teletext pages used for the Videotext information service comprise up to 24 data rows each of which can contain teletext display data, teletext non-display data, or a combination of both. Each data row comprises 40 character bytes. This format conforms to the aforementioned document "Broadcast Teletext Specification". A teletext page which includes teletext non-display data as programming information for the (VPV) facility is restricted in the amount of teletext data which can be used for displaying the programme details with which this facility is associated. This results in an editorial restriction of the layout of the teletext pages for displaying the programme schedules. This editorial restriction is further exacerbated by the inherent limitation of the teletext format used, which requires the teletext data for the programming information to be in the same data row as the teletext data for the associated displayed programme details.

It is an object of the present invention to lessen substantially such editorial restriction by providing an improved means for using teletext data for transmitting video recorder programming information.

According to the invention, a television transmission system comprising, a transmitter station including teletext data transmitting means, and at least one television receiver having interconnected therewith a video recorder, and wherein said teletext data transmitting means is arranged to transmit teletext pages containing both teletext display data representing displayable programme details and teletext non-display data representing programming information which is associated with the programme details and which can be used for video recorder programming; is characterised in tat said teletext non-display data is in addition to and does not replace possible teletext display data and that said teletext non-display data is contained in at least one extension packet which is in addition to data packets of a teletext page which can contain teletext display data.

A television transmission system according to the invention affords the advantage that because the programming information is not transmitted in those data packets of a teletext data which can contain teletext display data, these data packets may be utilised fully for transmitting displayed programme details.

The invention also comprises said teletext data transmitting means per se, when arranged to transmit in one or more extension packets of a teletext page containing data packets representing displayable programme details, teletext non-display data representing associated video recorder programming information.

In carrying the invention into effect a video recorder may be equipped with its own teletext decoder, as well as the normal television signal receiving circuits. Alternatively, a television receiver provided with a teletext decoder could be provided with a suitable control interface to a video recorder. In either case, a user would select teletext in conventional fashion and choose teletext pages giving details of television programmes.

The control arrangement within the teletext decoder would be such that on deciding to record a particular programme, a user causes a cursor to appear on the television screen by pressing a cursor button on a remote control unit. Further pressing of this button causes the cursor to move automatically to each next programme displayed on the page, until it reaches the desired programme. Subsequent pressing of a 'record this' button loads the corresponding information (programme source, date, time label) into the video recorder programming circuits automatically. The programming information is invisible to the user, who simply chooses the programme from the schedule presented on the screen.

European Patent Specification No. 0 191 149 (A1) also refers to another facility used in the existing television service in West Germany of labelling transmitted television programmes with identification information which gives "real-time" indications of programme "start" and "finish" times. This facility is called "Video Programme Service" (VPS) and reference is made in this European patent specification of the possibility of including this identification information as further teletext non-display data.

An important subsidiary feature of the present invention consists in the transmission by the teletext data transmitting means of such further teletext non-display data representing identification information in further extension packets whose contents a teletext decoder is adapted to receive, store and process without any page selection being effected. It is mentioned that the use of such further extension packets for transmitting other control information and the organisation of a teletext decoder to receive these extension packets without specific page selection being necessary, is already known in the art.

With this subsidiary feature provided, the VCR programming circuits of a video recorder look for broadcast identification information matching the previously downloaded programming information, and when there is a match (not necessarily at the previously intended time) the recording process is set in motion. In this way the selected programme is recorded on tape in a simple and efficient manner. The detailed methods of control would be a matter for individual video recorder manufacturers.

In order that the invention may be more fully understood reference will now be made by way of example to the accompanying drawings, of which:

In the performance of the invention, three considerations are important for the coding of the video recorder programming information which is transmitted within the teletext coding structure. Firstly, the way in which teletext pages are selected to ease a user's task, considering that several programmes may be chosen for days or even weeks ahead. This inevitably means a substantial number of teletext pages. Secondly, information must be coded for a given page to indicate the positions on a television screen appropriate for the cursor, and to associate with each cursor position control data relevant to the corresponding programme. Finally, the transmission of programme identification information at the time programmes are broadcast must be considered.

Figure 1:
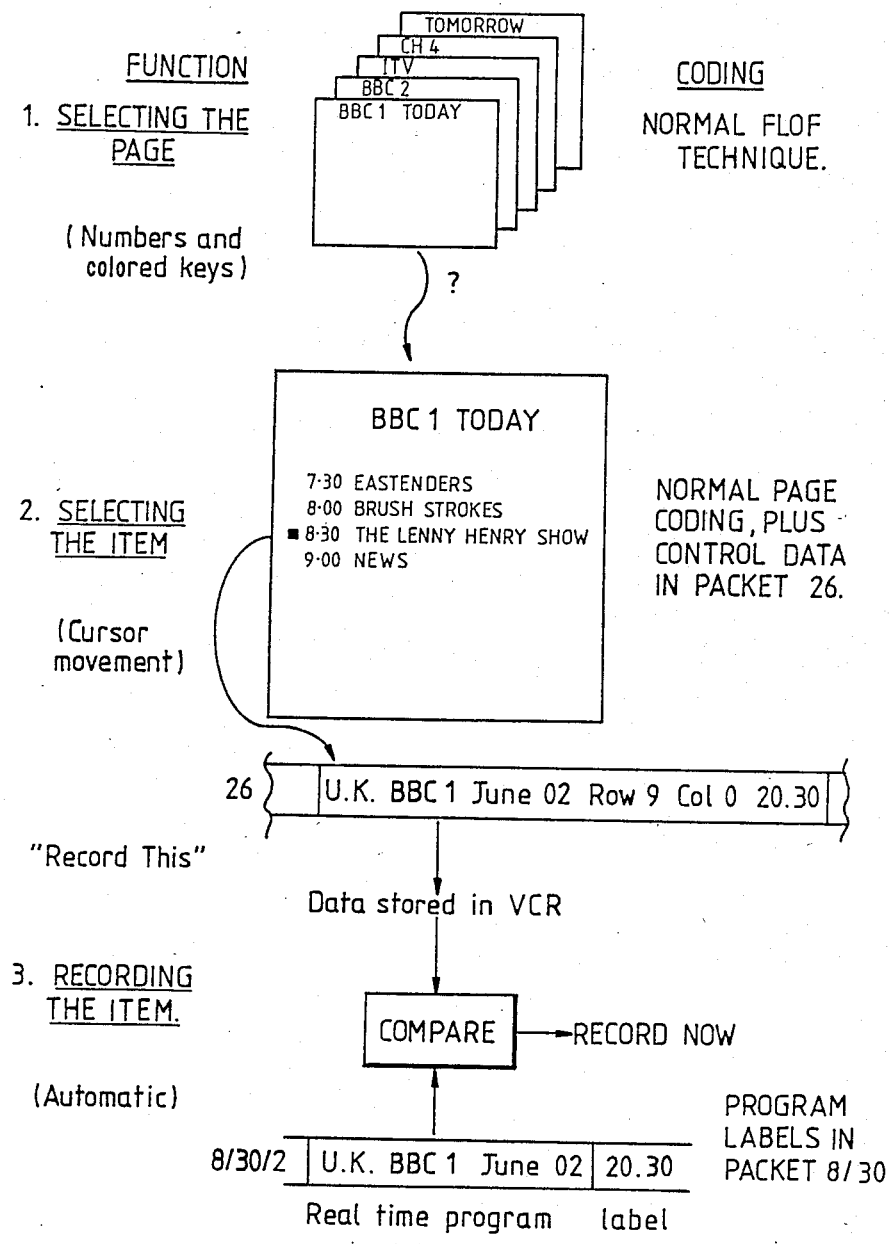
FIG. 1 shows diagrammatically the functions which are necessary for automatic video recorder programming in accordance with the invention.

The necessary functions for these considerations are summarised in FIG. 1 of the accompanying drawings. The first function "Selecting the Page" can be effected using the normal FLOF/Fastext system (see 'User Friendly Page Access (FLOF) Code of Practice', which is an Appendix to the World System Teletext Technical Specification published by the Department of Trade and Industry). No extra facilities are needed. The use of the sub-code page linking feature to 'freeze' rotating pages may be appropriate in many cases.

For the second function "Selecting the Item", the display of a programme schedule on a teletext page can be done with full editorial freedom. For example, a page giving programmes some days ahead might control a simple list of perhaps 16 programmes with titles and starting times. Conversely, a page might refer to just one programme, e.g. a film, with detailed background information. Normal page coding (including the status row for FLOF prompts) applies to the displayed information.

The editor has to decide how many titles of recordable programmes there are on the page, and allocate to each one a location on the screen (row and column) where it would be reasonable to place a cursor to refer to the title. The cursor position should precede the programme title on the same row, to allow it to be used for reference.

For the third function "Recording the Item", programming information for the associated programme is allocated to each designated cursor position, programme source, date and nominal starting time. All this information is coded into extension packet 26 using previously unallocated code combinations. This technique allows commonality of decoder hardware and software, as most future teletext decoders will also use packet 26 to obtain an extended language capability. Subsequently, when a "real-time" programme label transmitted in extension packet 26 corresponds to the stored programming information, the video recorder is rendered operable to record the associated programme which is then being transmitted.

Figure 2:
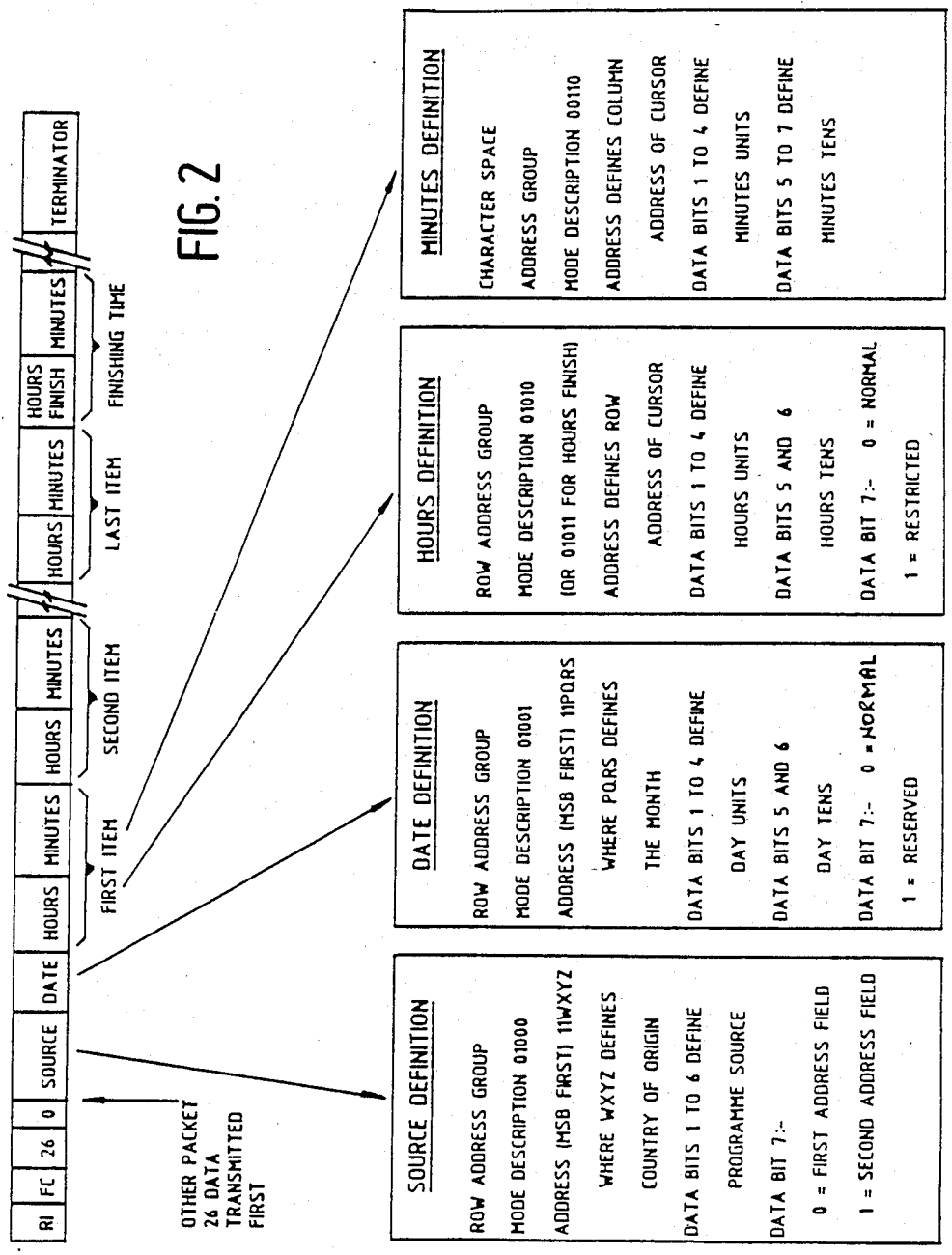
FIG. 2 shows a possible technique for coding video recorder programming information in the performance of the invention.

A coding technique using an extension packet 26 is shown in FIG. 2. This packet 26 comprises the usual clock run-in bits RI, a framing code FC, a packet number 26 and a packet 26 sub-code number 0. Four types of packet 26 groups ('triplets') are used to define programming information. They are, respectively, Source Definition, Date Definition, Hours Definition and Minutes Definition. Each "triplet" comprises 18 useful data bits of which 6 are address bits, 5 are mode bits and are data bits.

It is envisaged that the packet groups defining programming information would follow in the transmission order the transmission of any packet groups used for display or character set enhancement. All the programming information would be together and not interleaved with other functions. On completion of the programming information the normal termination rules would apply.

In general, a teletext page will contain programme titles for programmes from only one source on one date. The Source Definition and Date Definition groups should be transmitted first, but only one transmission per page is required. In contrast, a pair of Hours Definition and Minutes Definition groups must be transmitted for each programme title displayed. These pairs should be transmitted in the order of the cursor positions to which they refer (left to right and top to bottom).

If the Source or Date of a programme is different from its predecessor, a Source Definition or Date Definition group must be inserted as appropriate before the corresponding pair of Hours Definition and Minutes Definition groups. For each displayed programme title, the decoder uses the latest defined Source or Date values.

The Source Definition group is a packet 26 row address group with the mode description code set to 0100. It defines the source of the programme to which it refers, the country of origin and the transmitter network. The coding of this group does not address any particular location on the display, but is associated with a cursor location by virtue of its position in the transmission sequence as indicated above. Address values (decimal) of 48 to 63 define country of origin. The two most significant address bits define the country of origin. Data bits 1 to 6 define the programme source. Different programme source codes may apply to the same television channel at the receiver, for example to distinguish between national and regional programmes. The broadcaster should label local programme variations with the correct local source code, so that no ambiguity in recording can arise. It is up to each receiver to indicate to the user whether it is capable of receiving programmes from a particular source. Data bit 7 defines the address field, 0 giving the first address field and 1 the second address field. Effectively, this allows up to 128 programme sources to be defined per country.

The date definition group is a packet 26 row address group with the mode description code set to 01001. It defines the calendar date of the programme to which it refers. The coding of this group does not address any particular location on the display, but it is associated with a cursor location by virtue of its position in the transmission sequence as indicated above. Address values (decimal) of 49-60 define the month, 49 being January and 60 being December. Data bits 1 to 4 define the units digit of the day, in binary coded decimal form, with bit 1 the least significant bit. Data bits 5 and 6 define the tens digit of the day, with bit 5 the least significant bit. Data bit 7 is normally 0 to signify the programming function. When data bit 7 is set to 1 the data is reserved for future applications and should be ignored by the programming until the next Date Definition Group with bit 7 set to 0.

The Hours Definition group is a packet 26 row address group with the mode description code set to 01010. It defines the 'hours' element of the programme starting time, and is always the first of a pair of Hours and Minutes Definition groups. Address values (decimal) of 40-63 define the row address of the cursor position required. Values 41-63 define rows 1 to 23 and value 40 defines row 24 in conventional fashion. A cursor cannot be located in the page header, row 0. Data bits 1 to 4 define units digit of the hour, in binary coded decimal form, with bit 1 the least significant bit. Data bits 5 and 6 define the tens digit of the hour, with bit 5 the least significant bit. Data bit 7 is normally set to 0, but may be set to 1 to indicate a restricted condition. This allows the decoding equipment to generate a suitable status message or control if required.

The Minutes Definition group is a packet 26 character space address group with the mode description code set to 00110. It defines the 'minutes' element of the programme starting time, and is always the second of a pair of Hours and Minutes Definition groups. Address values (decimal) of 0 to 39 define the column address of the cursor position required, in conventional fashion. Data bits 1 to 4 define the units digit of the minute, in binary coded decimal form, with bit 1 the least significant bit. Data bits 5 to 7 define the tens digit of the minute, with bit 5 the least significant bit.

There is also an Hours Finish group which is a packet 26 row address group with the mode description code set to 01011. It is used in the same way as the Hours Definition group, in a pair with a Minutes Definition group, but defines the finishing time of the preceding programme referred to on the page. Display of the finishing time is optional at the editor's discretion. The finish pair allows the equipment to calculate the amount of tape required to record the last item on a page. It should also be used within a page where the finishing time of a programme is different from the starting time of the next programme.

The assignment of programming information to a teletext page requires the transmission of additional information in packet 26, as indicated above. However, the overhead is quite small, and each page only requires sufficient packets 26 to deal with the number of programmes decided by the editor. Assuming a page refers to only one source on one date 5+2N triplets are required where N is the number of programmes. Each packet 26 contains thirteen triplets; the capacity of the technique is tabulated below.

| No. of packets | No. of programmes | Transmission overhead |
|---|---|---|
| 1 | 4 | 4% |
| 2 | 10 | 8% |
| 3 | 17 | 11% |
| 4 | 23 | 15% |
| 5 | 30 | 19% |
| 6 | 36 | 23% |

With present editorial techniques a typical programme schedule page contains less the 17 programme titles. This could have programming information assigned in 3 packets 26 with a transmission overhead of approximately 11%. As the pages would probably be a small proportion of a teletext service, the overall transmission overhead (in terms of increased access time or reduced number of pages) is small.

The programme labels at the time of transmission are sent in packet 8/30 format 2. (See section 13.3 of the WST specification).

Packet 8/30/2 should be transmitted once per second, interleaved with the normal packet 8/30/0 for FLOF purposes. The initial page and status message fields of packets 8/30/0 and 8/30/2 should be identical. A delay of at least 100ms should elapse between transmissions of the two types of packet 8/30. These constraints permit the use of slow (cheap) decoder software and allow a faster presentation of status messages while scanning through channels.

In order to allow sufficient time for reliable reception of the signal and the starting time of the recorder mechanics, the programme label should be transmitted 10 seconds in advance of the corresponding programmes.

The system allows simplified programming as described when used with a video recorder having full facilities including a teletext decoder. However, it is also envisaged that there will be a significant number of simple video recorders in the field. These will not include a full teletext decoder for reasons of cost, but will be capable of receiving the programme labels in packet 8/30/2.

As a result, these simple machines are capable of dealing with programme schedule alterations, but still have to be programmed by the user in conventional fashion. Consequently the programme labels used must be compatible with normal time schedules, particularly as some broadcasters may not provide a programming service, when the video recorder must revert to using a conventional timer.

The programme labels should be normally in local time at the originating centre. The same local time should be used in the teletext programme schedule page. If the programme schedule is altered, the original label corresponding to the first published starting time must be maintained. In this case, a revised teletext schedule should show the new starting time, but also needs to display the original label for the benefit of owners of manually programmed video recorders. The editor should clearly identify the label for such a programme, perhaps using a different colour in a standard way. Similar indication of a different label should be published in any medium giving programme schedules, for example a newpaper.

If programme schedule information is published in a different time zone from the programme source, it is necessary to indicate labels for every programme item. This gives the user of a manually programmed video recorder the correct programming data, which is no longer local time at the receiver.

Under normal circumstances (no programming alterations and receiver in the same time zone as the transmitter) labels and local times are identical and there is no need for separate indication of programming information.

Figure 3:
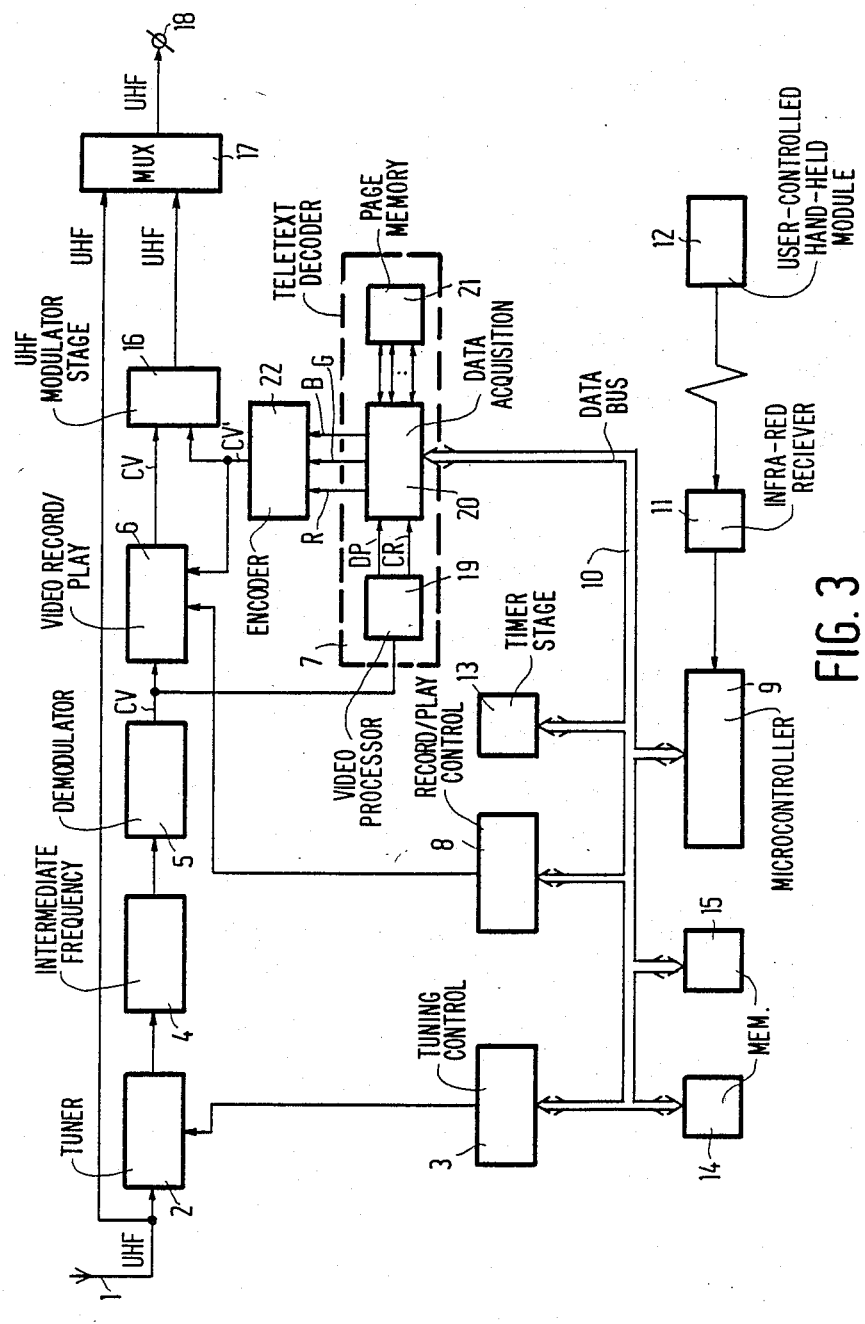
FIG. 3 shows diagrammatically a video recorder with its own teletext decoder for use in a system according to the invention.

The video recorder represented by the diagram shown in FIG. 3 is provided with its own teletext decoder for the performance of the invention. This video recorder comprises an aerial input 1 for receiving UHF television signals from a transmitting station (not shown). The received television signals are applied to a tuner stage 2 which is tunable to different television channels by a tuning control circuit 3. The output signal from the tuner stage 2 is applied to an intermediate frequency stage 4 whose output signal is in turn applied to a demodulator stage 5.

The output signal from the demodulator 5 is a composite video signal which is applied to video record/play stage 6 and also to a teletext decoder 7. The operation of the video record/play stage 6 is under the control of a record/play control circuit 8. The operations of the two control circuits 3 and 8 and of the teletext decoder are determined by a microcontroller 9 over a data bus 10. A remote control stage comprising an infrared receiver 11 and a user-controlled hand-held module 12 with a keypad and an infra-red transmitter transmit user select signals to the microcontroller 9. There are also connected to the data bus 10 a timer stage 13 which provides a combined clock/calender for the video recorder, a non-volatile memory 14 in which channel tuning data for the tuning control circuit 3 is stored, and a non-volatile memory 15 in which programming and control data for the various record and play functions of the video recorder are stored.

The record/play stage 6 produces a composite video signal CV on playback. This signal CV is applied via a UHF modulator stage 16 which re-establishes a UHF television signal which is applied via a multiplex stage 17 to an output terminal 18 of the video recorder The received UHF television signal at the aerial input 1 is also applied directly via the multiplex stage 17 to the output terminal 18.

The teletext decoder 7 comprises a video processor 19, a data acquisition circuit 20 and a page memory 21. The video processor 7 receives the composite video signal CV from the demodulator stage 5 and produces data pulses DP and clock pulses CP from the teletext data contained in the signal CV. The data pulses relating to required teletext pages are acquired selectively by the data acquisition circuit 20 and stored in the page memory 21. When stored data is read out from the teletext decoder for utilisation, it is in the form of RGB signals which are colour encoded by an encoder stage 22 to restitute a composite video signal CV'. This signal CV' is applied to the modulator stage 16 to re-establish a UHF television signal for a teletext display page. The signal CV' may also be applied to the record/play stage 6 for recording, for instance when it represents subtitles.

In the performance of the invention the microcontroller 9 performs the following functions:

(i) The control of the teletext decoder for receiving and displaying requested programme pages, together with the programming information in packet 26.

(ii) The cursor movement on a displayed programme page.

(iii) The extraction of programming information from a page stored in the page memory and the re-storage of this programming information in the memory 15.

(iv) The comparison of the stored programming information with the programme identification information transmitted in "real-time" in the further extension packets 8/30/2.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived therefrom.

What is claimed:

1. A television transmission system comprising:
   (a) a transmitter station including teletext data transmitting means for transmitting teletext pages containing:
      (i) teletext display data representing displayable programme details; and
      (ii) teletext non-display data representing programming information associated with the programme details, which non-display data is:
         (A) usable for video recorder programming;
         (B) in addition to and not replacing possible teletext display data; and
         (C) contained in at least one extension packet which is in addition to data packets of a teletext page contains teletext display data;
   (b) at least one television receiver; and
   (c) at least one respective video recorder, interconnected with a respective one of the at least one television receiver.

2. The system of claim 1 wherein said teletext pages also contain further teletext non-display data representing identification information in further extension packets, said identification information representing "real-time" indications of programme "start" and "finish" times.

3. Teletext data transmitting apparatus for transmitting teletext pages containing:
   (i) teletext display data representing displayable programme details; and
   (ii) teletext non-display data representing programming information associated with the program details, which non-display data is:
      (A) usable for video recorder programming;
      (B) in addition to and not replacing possible teletext display data; and
      (C) contained in at least one extension packet which is in addition to data packets of a teletext page contains teletext display data.

4. Teletext data transmitting apparatus as claimed in claim 3, wherein said teletext pages also contain further teletext non-display data representing identification information representing "real-time" indications of programme "start" and "finish" times.

5. A video recorder comprising:
(a) a teletext decoder for selecting, receiving, and storing a teletext page containing:
 (i) teletext display data representing displayable programme details; and
 (ii) teletext non-display data representing programming information associated with the programme details, which non-display data is:
(A) usable for video recorder programming;
(B) in addition to and not replacing possible teletext display data; and
(C) contained in at least one extension packet which is in addition to data packets of a teletext page contains teletext display data; and (b) means for automatically programming the video recorder in accordance with said programming information for recording a selected program.

6. The recorder of claim 5 further comprising:
(a) means for receiving further teletext non-display data representing identification information in further extension packets, said identification information representing "real-time" indications of programme "start" and "finish" times;
(b) means for comparing said identification information and said programming information; and
(c) means for initiating recording of a programme to which the programming information pertains when there is correspondence between said identification information and said programming information.

* * * * *